Nov. 23, 1965 J. J. KINSELLA 3,219,509

APPARATUS FOR AUTOMATIC FABRICATION OF MICROCIRCUITRY

Filed July 18, 1962 5 Sheets-Sheet 1

INVENTOR.
JOHN J. KINSELLA

BY Stanley Z. Cole

ATTORNEY

APPARATUS FOR AUTOMATIC FABRICATION OF MICROCIRCUITRY

Filed July 18, 1962

5 Sheets-Sheet 2

INVENTOR.
JOHN J. KINSELLA

BY Stanley Z Cole

ATTORNEY

APPARATUS FOR AUTOMATIC FABRICATION OF MICROCIRCUITRY

Filed July 18, 1962

5 Sheets-Sheet 3

INVENTOR.
JOHN J. KINSELLA

BY Stanley Z. Cole

ATTORNEY

INVENTOR.
JOHN J. KINSELLA
BY Stanley Z. Cole
ATTORNEY

Nov. 23, 1965 J. J. KINSELLA 3,219,509

APPARATUS FOR AUTOMATIC FABRICATION OF MICROCIRCUITRY

Filed July 18, 1962 5 Sheets-Sheet 5

INVENTOR.
JOHN J. KINSELLA

BY Stanley Z. Cole

ATTORNEY 3,219,509
Patented Nov. 23, 1965

3,219,509

APPARATUS FOR AUTOMATIC FABRICATION OF MICROCIRCUITRY

John J. Kinsella, Rochester, N.Y., assignor to Xerox Corporation, Rochester, N.Y., a corporation of New York Filed July 18, 1962, Ser. No. 210,774
5 Claims. (Cl. 156—345)

This invention relates to xerography and specifically to xerographic apparatus for the automatic fabrication of printed microcircuits.

In recent years, a technical revolution has been occurring in electronics. In keeping with the growing need for complexity in electronic circuitry, techniques have been developed so that the fabrication of electronic circuit assemblies increasingly has been automated whereby the laborious hand assembly previously required has been substantially reduced. One technique which has contributed to this recent advance is the development of printed circuits wherein printed conductors or the like on a dielectric substrate connect the various passive circuit elements thereby eliminating the necessity of individual soldered wire connections.

Printed circuits and their fabrication have become well known and essentially they consist of a dielectric substrate on which are formed electrical conducting lines. One means to produce these circuits is to coat the dielectric with a metallized surface which in turn is selectively coated in the desired circuit areas with a protective material, commonly called "resist" so that the desired circuit areas are covered. The unprotected metal areas are then completely removed in a chemical etching bath after which the resist is removed to expose the circuit elements.

More recently, there has been discovered a process whereby both conductive lines and the resistor elements may be formed as integral parts of the printed circuit thus eliminating the separate handling and soldering of the resistor components and providing a more compact printed circuit. This is accomplished by employing a dielectric substrate clad first with a layer of material having the desired order of resistivity to form resistive circuit elements and then with a layer of conductive materials. By selectively and successively etching the respective layers, the integral circuit components are formed.

With the growing change from tube circuits to transistor circuits, a new technique known as microminiaturization has led to the development of a module system of forming electric assemblies. This system has been pioneered by Diamond Ordnance Fuze Laboratories. In this system, a flat plate or substrate is processed to form the resistors, condensers and conductive lines, while the three dimensional components, generally as packaged elements such as transistors and diodes, are inserted to form the complete circuit. As the thin film circuit elements, that is the resistors, condensers and conductive lines are formed on the wafer itself, they are essentially two-dimensional circuit components. Thus, such circuits are generally termed "two-dimensional" or "2D" circuits. Generally 2D circuits have been formed by evaporation processes, as by forming stencils corresponding to the separate circuit elements and successively evaporating the different compounds through the successive stencils thereby forming these precise circuit elements in the precise place desired on the substrate.

In the module technique of circuit miniaturization a wafer of uniform size is selected as, for example, a dielectric substrate 1″ by 1″ or whatever size is deemed suitable. Substrate circuit components are then assembled or formed in sections on the individual wafer. Complete circuits are then formed by combining the individual wafers which may be arranged in parallel held fixed for example by means of rigid end-plates which may themselves contain sections of circuit components. Three dimensional elements may then be attached to either the wafers or the end-plates.

The prior art therefore has made significant advances in printed circuited technology including advances in the technique of circuit microminiaturization. However, despite the advances in the art of microminiaturization, the art has been largely handicapped by an inability to produce the circuit panels in volume and on demand as required. Thus, panel production heretofore has been largely on an individual basis in which the individual panel is hand processed through the various mechanical and chemical steps in accordance with requirements. This has not caused any great difficulty as, for example, in limited productions of small appliances, but where the circuit requirements are complex and voluminous, these hand processings have proven too expensive and unsuitable in keeping with production requirements.

Therefore, despite all the advances in the art, fabrication of printed circuits has been slow, tedious, cumbersome and inaccurate and not adapted to producing microcircuits in volume with a high degree of precision. For example, it is conventional in the printed circuit art to use large boards cut to approximate final size from much larger stock such that the circuit elements thereon need not be precisely located within the area of the board. After forming the circuit, the board is trimmed to final dimensions. This prior procedure cannot conveniently be applied to microcircuitry wherein the boards may be comprised of thin wafers, one inch square or less, and on which, unless the components are precisely located and formed, the utility of the circuit is destroyed These and other difficulties are overcome by means of the instant invention in which there is provided apparatus adapted to produce microcircuit panels on a mass production basis while, at the same time, according an operator of the apparatus the element of circuit selectivity on demand. By producing such boards in accordance with this invention, the cost is also substantially reduced making use practical in devices for which hand-made boards could not previously be employed. These boards improve such devices thereby benefiting the public in general through this advance in this art.

Accordingly, it is an object of the invention to provide novel apparatus for the formation of microcircuit panels.

It is a further object of the invention to utilize novel techniques to mass produce microcircuit panels selectively and on demand.

It is a further object of the invention to provide apparatus to precision form microcircuit panels in a dependable and efficient manner.

It is a still further object of the invention to provide novel apparatus to mass produce microcircuit panels onto pre-laminated wafer structures.

Other objects and advantages of the present invention will be more readily apparent in view of the following detailed description, especially when read in conjunction with the accompanying drawings, wherein.

Figure 1:
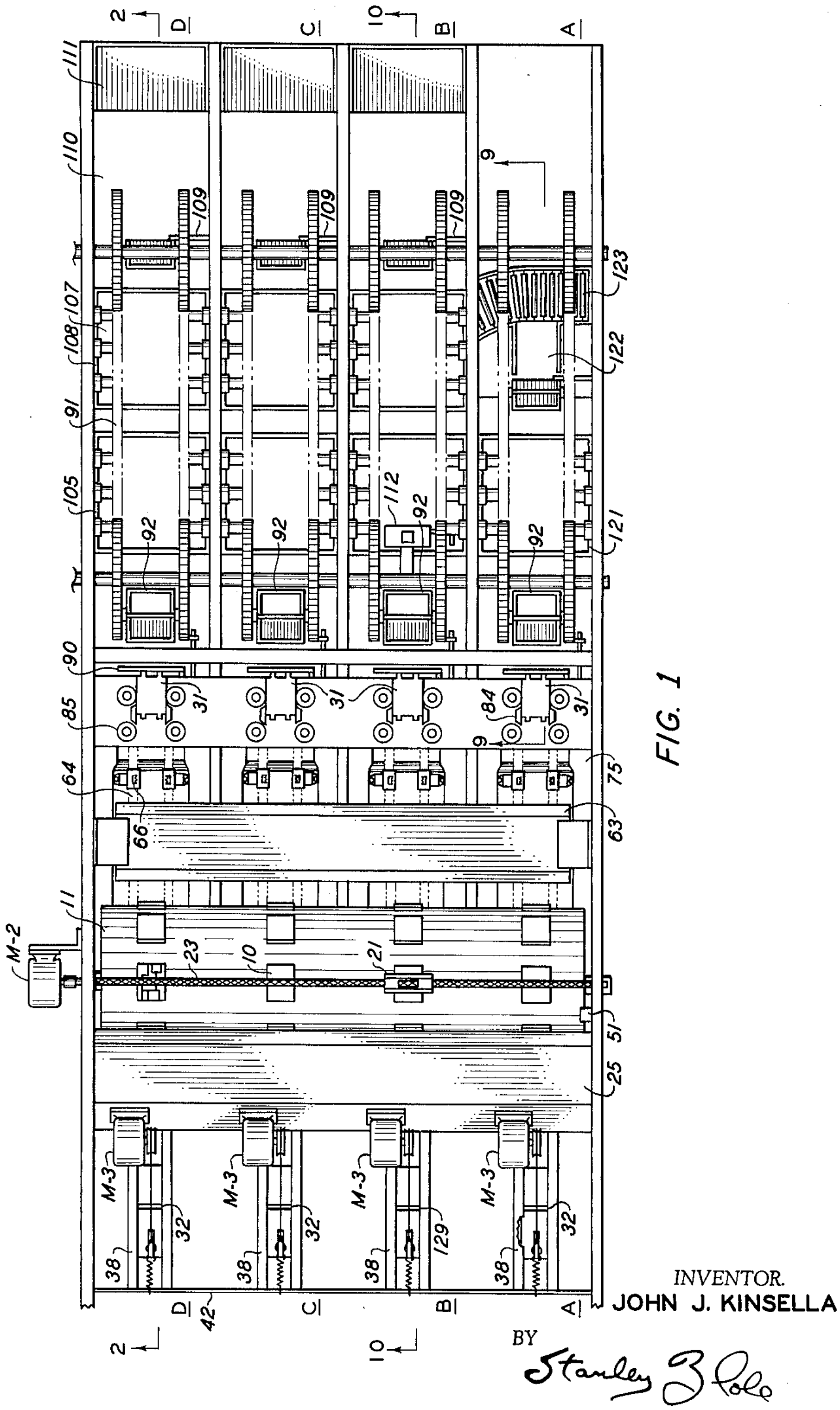
FIG. 1 is a plan view of an apparatus constructed in accordance with the invention.
Figures 2, 6:
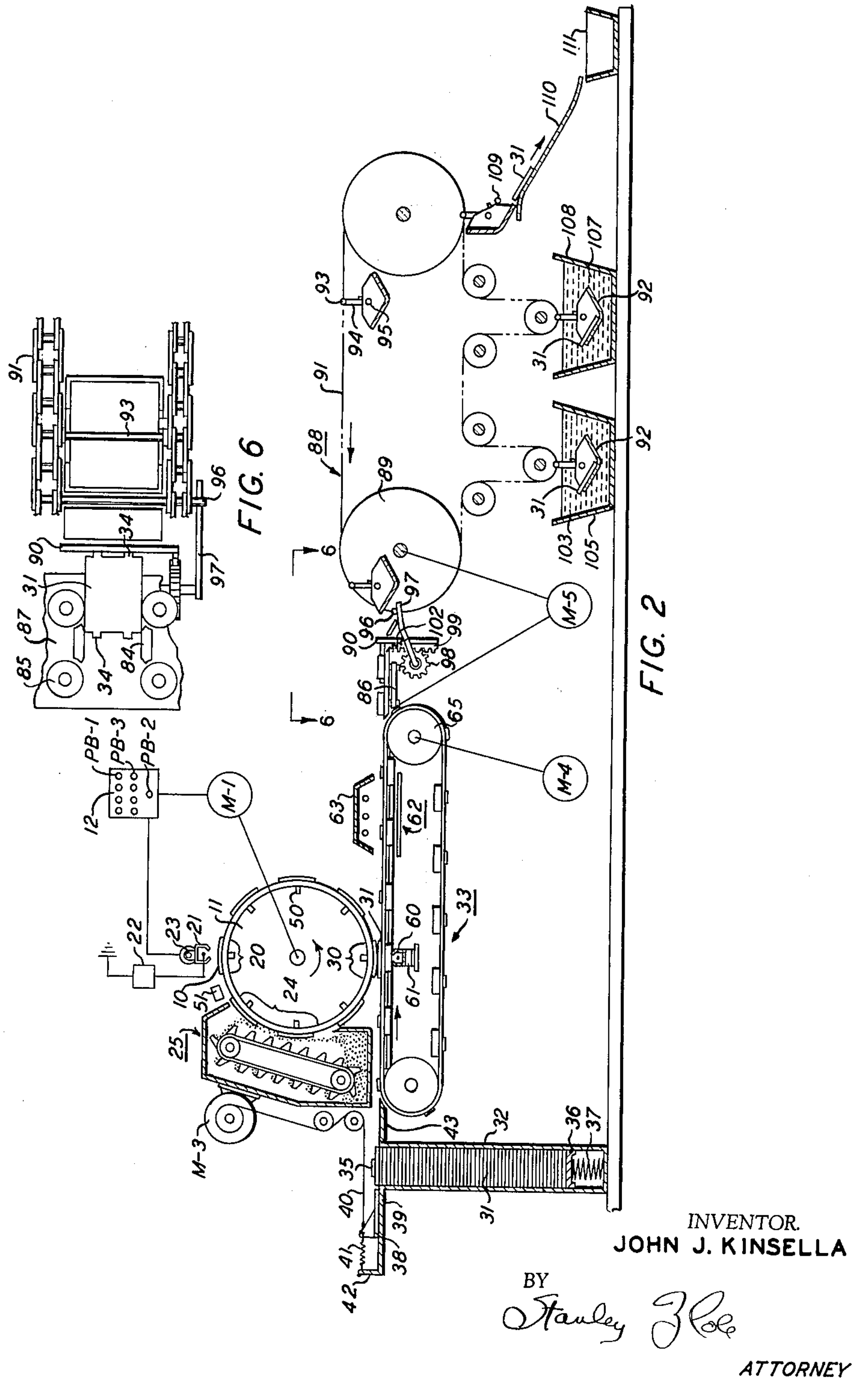
FIG. 2 is a sectional elevation taken substantially along the lines 2—2 of FIG. 1.
FIG. 6 is a fragmentary enlarged plan view at the position 6—6 of FIG. 2.

Referring now to FIGS. 1 and 2, a plurality of individual master patterns 10, each representative of an individual whole or section of a microcircuit are mounted about the periphery of a cylindrical drum 11 suitably mounted for rotation and adapted to be driven by a motor M–1. Each of the master patterns may be representative of a different portion of an integral circuit to be supplied to a module and are previously prepared from large scale layout drawings or the like. The master patterns in accordance with an embodiment of the invention may contain circuit elements formed on exposure to a xerochemographic plate as disclosed, for example, in copending application Serial No. 682,980, filed September 9, 1957 in the name of Ebert now patent U.S. 3,081,165. This particular master form accords the benefit of providing a persistent developable image pattern for a prolonged period following a single light exposure. At the same time, the image is erasable and permits reuse of the master member for different image patterns.

In another embodiment, which is that illustrated, the master pattern is formed of an electrically insulating material supported on a conductive background or the like. In this form, the circuit areas of the patterns selectively retain electrostatic charges and may be utilized in the process of xeroprinting as disclosed, for example, in Schaffert patent U.S. 2,576,047.

As disclosed by Schaffert, a xeroprinting plate may consist of light-insensitive electrostatically insulating characters on an electrically conductive backing. One method of forming such a xeroprinting plate is to fuse a powder image onto the photoconductive insulating layer of a xerographic plate and then, subject the structure to a further treatment as by chemical etching or heating to selectively remove the photoconductive insulating material leaving only a light-insensitive image thereon. Optionally, the photoconductive layer can be preserved and the plate utilized in the presence of light to render the nonimage areas of the plate continuously conductive. Another method of forming a xeroprinting plate is to transfer an image from a xerographic plate to a metal backing or alternatively to utilize a silk screen or other means to form an electrically insulating image directly on a metal backing. The resulting image is then permanently affixed or bonded to the metal substrate as by heat or contact with solvent vapor.

Preparation of the master patterns includes reducing large scale circuit layout drawings by conventional projection techniques to the desired size. After reducing the large scale drawings, the reductions are converted to xeroprinting master patterns in which a permanent image of the pattern is formed that is repeatedly reusable, as will be understood, without deterioration of image quality. Each of these master patterns are characterized in that they retain an applied electrostatic charge on the surface of the image pattern corresponding to the circuit components and when in the charged state, can be developed with an electroscopic developer powder. The master patterns may be permanently secured to the drum periphery in which case the drum may be supported for interchangeability or alternatively, the drum may be permanently installed in which case the patterns can be secured thereabout by means of a removable flexible support base. By this means, any preselected number of module patterns can be contained on one surface, and the utility of the apparatus is enhanced because substitution of additional drums or support surfaces is possible or substitution of master patterns is possible. As can be seen, the patterns are arranged about the drum periphery aligned both axially and peripherally for reasons as will be understood.

Operation of the motor M–1, which is effective to rotate the drum, is under control of a master controller 12 having a set of separate selector push button switches PB–1 as well as a continuous-run push button PB–2. Each of the selector push buttons are adapted to index the drum to an appropriate "start" position whereby a selective circuit will be produced from any one individual master pattern. The run switch is adapted to rotate the drum through the processing steps of charging the selected circuit pattern, developing the circuit pattern by means of an electroscopic powder to be described and then transferring the developed pattern to a wafer support surface on which the microcircuit is to be formed. As will be understood, the apparatus is adapted for either selective or continuous operation.

Once a pattern has been appropriately selected for reproduction, it is indexed to a start position just prior to a charging station 20.

For applying a charge to a pattern at the charging station, there is supported in charging relation to the pattern surface, a corona charging unit 21 which may, for example, be of a type disclosed in Vyverberg patent U.S. 2,836,725, and which is connected to a potential source 22. The corona charging unit is supported on a reversible driving screw 23 which axially spans the drum and is operatively adapted to position the corona charging unit above a selected pattern. Positioning of the charging unit is effected by appropriate selection of a push button PB–3 that is adapted to energize motor M–2 to drive the reversing screw 23 until the charging unit is opposite the pattern to be reproduced. Thus by energizing or depressing the appropriate push buttons PB–1 and PB–3, both the drum and charging unit are appropriately positioned while an associated plate processing unit is electrically alerted to operate in conjunction with reproduction of the pattern. Optionally, the selective feature of the apparatus may be dispensed with and the apparatus operated for continuous high volume production. In the latter instance, one or more corona generators may be permanently positioned relative to the patterns on the drum in which case, all patterns are continually charged on each rotation of the pattern past or through the changing station 20. One characteristic of xeroprinting with image patterns of the type described is that only an initial charge application is required when utilizing electrostatic transfer of a developed image as will be described. It has been found that such transfer has the effect of recharging the image pattern.

With the pattern and charging unit thus positioned, the drum is caused to rotate while corona generating device 21 is energized to a charging potential to apply a uniform electrostatic charge onto the surface of the master pattern. The charge applied is retained only in the circuited pattern areas. As the cylinder rotates, the charging pattern first passes developing station 24 at which the charged pattern is developed by developing apparatus 25 which may, for example, be of a type disclosed in copending application, Serial No. 393,058, filed November 19, 1953 in the name of Mayo et al., now abandoned. The developing apparatus is adapted to cascade an electroscopic resist developing material which may, for example, be of a type disclosed in Carlson Reissue Patent U.S. 25,136 and which is attracted selectively to the charge circuit pattern on the master to effect its development. As the drum continues to rotate, the developed pattern is next advanced to a transfer station 30 whereat developer applied at the developing station is transferred to a wafer 31 on which it forms a resist pattern.

Associated with each peripheral column of master patterns is a plate processing unit designated A, B, C and D in FIG. 1 and each including a magazine 32 and a conveying means 33. The magazine contains a stack of individual wafers 31 on which the circuits are to be printed and is adapted to release wafers in response to reproduction of a master pattern contained in its corresponding column. Preferably, each magazine stores wafers of a like type, i.e., of like geometrical configuration, like electrical properties and a similar state of process. For example, each magazine may include wafers for conductor circuit portions with projecting tabs, or end-plates, as described, without any previous processing, or identically processed previously.

Figures 3, 9:
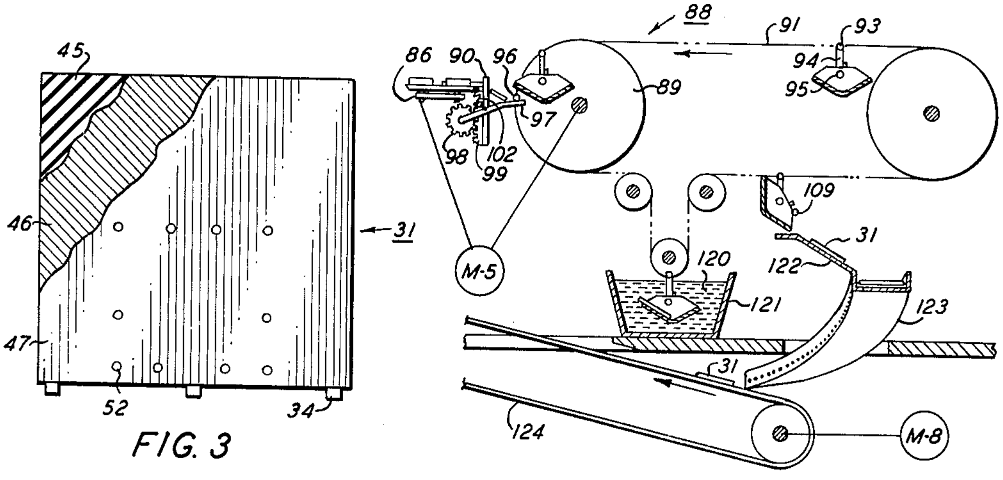
FIG. 3 is a wafer as typically processed by the apparatus of the invention.
FIG. 9 is a sectional elevation taken substantially along the lines 9—9 of FIG. 1.
Figure 4:
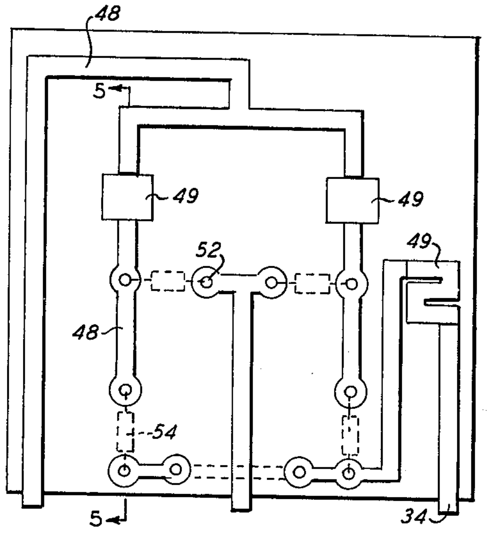
FIG. 4 is a circuit formed in accordance with the invention on the wafer of FIG. 3.
Figure 12:
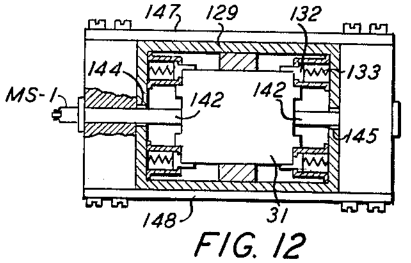
Figure 5:
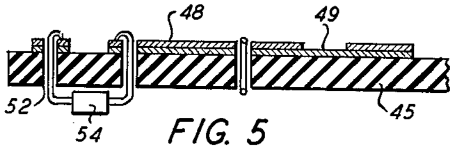
FIG. 5 is a sectional view taken substantially along the lines 5—5 of FIG. 4.

Referring now to FIGS. 3 to 5, there is illustrated a type wafer as may be processed by the apparatus of the invention. Each wafer on which the circuit is to be formed includes a substrate 45 which is a planar member having dielectric properties and high mechanical strength, as for example, a phenol formaldehyde laminate, a ceramic material, etc., as is conventional in the printed circuit art, and may include, for example, projecting tabs 34 to be used in connection with assembling the particular wafer into its module relationship.

The wafer therefore is comprised of a laminated structure consisting of a substrate plate 45 or base supporting a range of layers of different electrical properties. For example, the substrate can be a dielectric material over which a layer 46 of material having a desired order of resistivity is applied to form a base for the resistance circuit elements of the particular circuit to be formed. Overlying the resistive layer, there may be formed a layer of conductive material 47. Further layers or partial layers may be applied as required. These successive films are generally deposited by vacuum evaporation, as is known in the art. These wafer plates differ from conventional two-dimensional plates in that the individual layers are not deposited in a specific circuit geometric pattern but are processed in accordance with the invention to produce a pattern and may be formed by evaporating the material to the substrate without masking except for the dielectric evaporation only. Holes 52 may be provided for mounting of packaged elements.

Thus it is possible by proper selection of dielectric, conductive and resistive layers to form a basic circuit plate consisting of uniform layers of each material, i.e., without any specific geometry being required for the dielectric layer. It is essential, however, in selecting material for such a plate that they be so chosen to permit selective etching of each layer without harming the respective underlying layers. As will be shown, the wafer is processed by the apparatus of the invention to form conductor lines 48 and resistors 49 and to which may be connected diodes or the like 54. Similarly, capacitors or the like may be formed as, for example, described in my copending application, Serial No. 26,642, filed May 12, 1960.

Referring again to FIGS. 1, 2 and also 6, a stack of wafers in each of the magazines is continuously urged upward against a stopbar 35 by a spring urged follower plate 36 supported over a compressed spring 37. The stopbar serves to align the uppermost wafer in loading relation with a feeding bar 38 adapted to push the wafer onto a platform 43 and then onto associated conveyor means 33. The feeder bar is adapted to be slideably moved between a pair of dove-tail guides 39 by means of a cable 40 connected to be drawn by a motor M–3. For selective operation, motor M–3 is operative when the associated peripheral columns of master patterns is energized in timed relation to the energizing of corona charging unit 21. Thus a wafer arrives at the transfer station 30 coincident with the arrival of a selected developed pattern. On de-energizing motor M–3, spring 41 secured at the opposite end to post 42, restores the feeder bar to the pre-feeding position illustrated.

For continuous operation, there is provided a magnetic indicia 50 on the side of the drum positioned relative to each axial row of patterns on the drum periphery sensed by a magnetic head 51 disposed above the drum approximately between the charging and developing stations. On sensing a mark for continuous operation, each motor M–3 is energized to feed a wafer onto its corresponding conveyor. The head is electrically connected to operate the motor on continuous operation and it is mounted and adapted for adjustment to correlate the sensing and feeding operation. Thusly, coincident arrival of the pattern and wafer at the transfer station is assured. Loading of the magazine is accomplished from the top by removing stopbar 35.

Supported below the conveying means at the transfer station of each conveyor is a second corona generating device 60 of the same type as corona generating device 21 mentioned above (see also FIG. 8). Each generator 60 is supported on a stationary channel 61 and is adapted to be energized concomitantly with reproduction of a mastern pattern associated in arrangement with the particular conveyor. At the transfer station therefore, an elecrostatic charge is applied by means of corona generator 60 to the back of the wafer moving therepast on conveying means 33, to effectively attract and transfer the developed image from the master pattern to the surface of the wafer member. After transfer, the wafer member continues to be advanced by means of the conveying means, as will be described, past a fusing station 62 whereat the resist image is securely bonded to the wafer surface by means of a fuser apparatus 63 which may, for example, be of a type disclosed in Carlson Patent U.S. 2,776,907, or alternatively may be of the radiant panel type as described in Crumrine Patent U.S. 2,852,651. It is to be noted that for the preferrd embodiment of the invention, vapor fusing is preferred using solvent vapors for the developer material such as trichloroethylene. It has been found that vapor fusing softens the developer into a cohesive mass more completely than with heat fusing avoiding the possibility of pinholes in the resist pattern.

Figure 8:
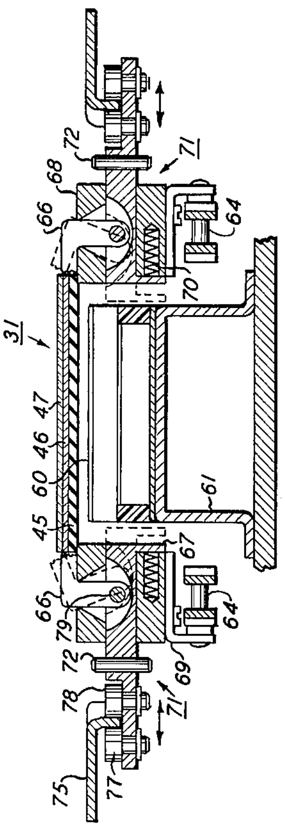
FIG. 8 is a sectional elevation taken substantially along the lines 8—8 of FIG. 7.
Figure 7:
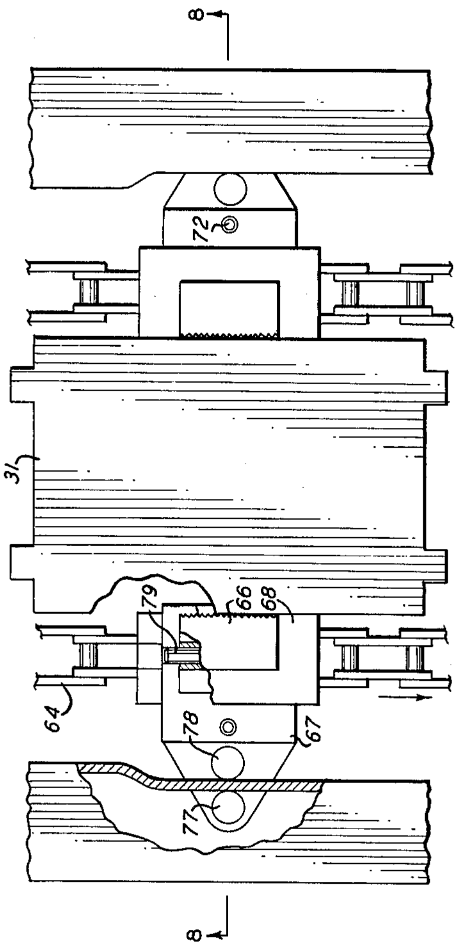
FIG. 7 is an enlarged partial plan view of the wafer conveying and gripping mechanism.
Figure 11:
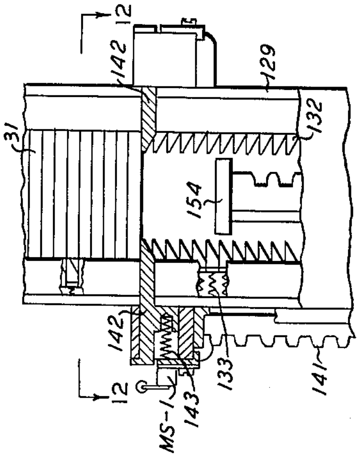
FIG. 11 is a fragmentary enlargement of the magazine wafer loader of FIG. 10; and, FIG. 12 is a sectional plan taken substantially along the lines 12—12 of FIG. 11.
Figure 10:
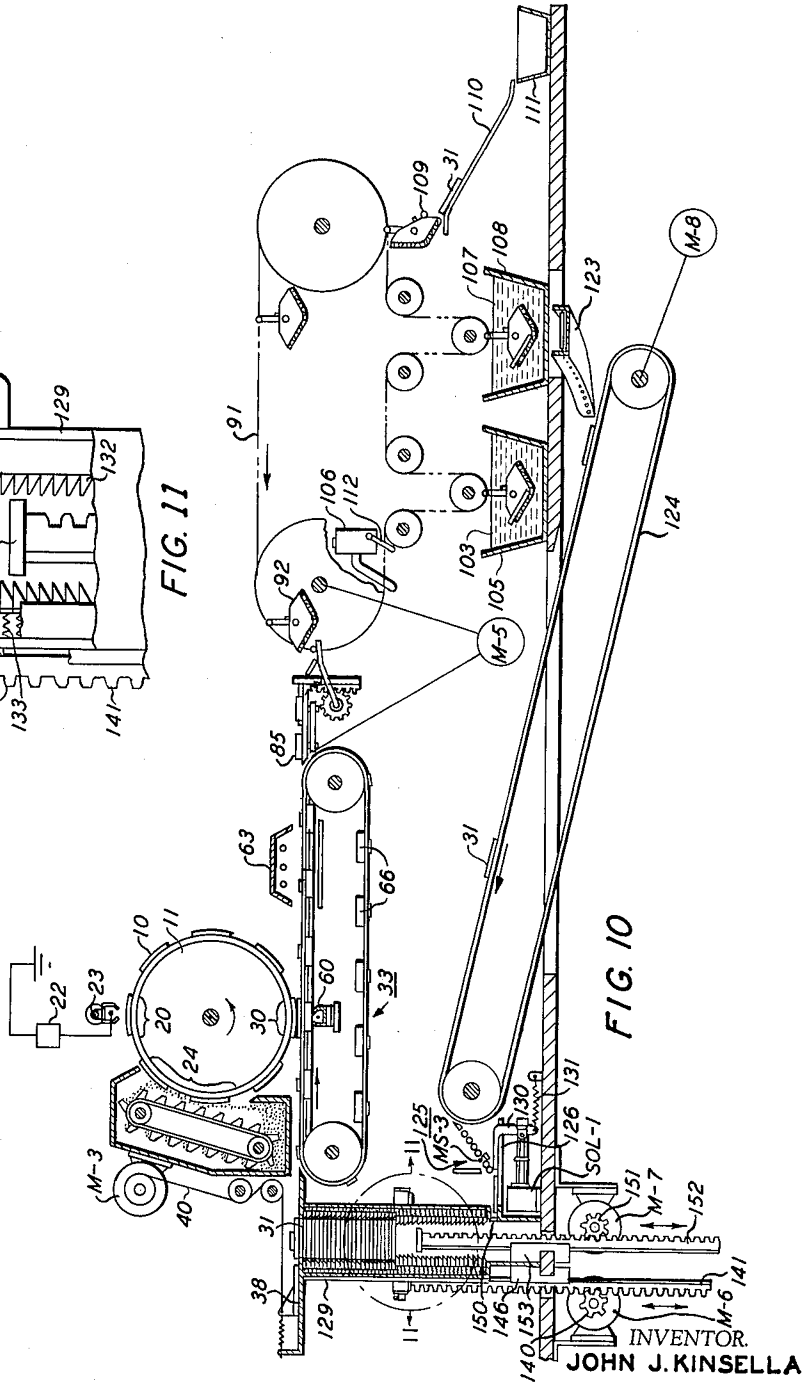
FIG. 10 is a sectional elevation taken substantially along the lines 10—10 of FIG. 1.

Referring now particularly to FIGS. 7 and 8, conveyor means 33 includes a pair of spaced apart parallel chains 64 driven from a sprocket drive 65 operatively connected to a motor M–4. The conveyor moves the wafers at a synchronous linear rate with the master pattern rotatively advancing on the drum. To ensure positive movement of the wafer, there is included a continuity of spaced and oppositely arranged individual gripper units 71 each having a gripper finger 66 supported on a cam operated slide 67, in turn, slideably supported on a base 68 supported by bracket 69 secured to the chain. The slides are normally urged inwardly toward each other to a position (shown dashed) by a spring 70 secured in the base and causing the gripper fingers to pivot apart in a manner whereby a wafer supported therebetween will be released. A stop pin 72 limits the maximum forward movement urged by the spring.

Extending along the top section of each conveyor is a cam means 75 having a turned down cam 76 on which a pair of rollers 77 and 78 rotatably mounted on slide 67 are adapted to ride. The rollers in advancing with the chain, follow the contour of the cam, as can be seen in FIG. 7, such that as the rollers are drawn leftwardly in the sectioned portion of FIG. 7, fingers 66 are caused to pivot about pivot pin 79 until gripping the sides of the wafer 31. Therefore as the gripper is advanced to the feeding position of the magazine, the slide engages the cam plate 75 causing the fingers to pivot inwardly and grasp the wafer to advance it positively towards the transfer station. This, then, ensures first that the bottom of the wafer is exposed to transfer corona generator 60 while at the same time, the wafer is easily separated from the master pattern after application of the transfer charge at the transfer station.

After passing the transfer station, the wafer continues to be advanced by the gripper fingers past the fusing station until the cam permits the grippers to release the wafers as they enter the bite of feed rolls 85 (FIG. 6). The feed rolls are all connected via a belt 86 driven continuously by a motor M–5. Each feed roll has a relatively smooth periphery that is effective on engaging the sides of the wafer to advance the wafer through parallel guides 84 and over platform 87 but at the same time, will permit a slippage of their surfaces in the event the wafer is impeded by gate 90. By this means, a wafer having been advanced off conveyor means 33 is supported on a support platform 87 whereat they are retained until transferred to process conveyor 88, likewise driven by motor M–5 through a sprocket arrangement 89 driving parallel spaced chains 91. At the forwardmost end of platform 87 in the direction of transport is a gate 90 which when up, prevents feeding of the wafers to the process conveyor.

Conveyor 88 includes a plurality of open buckets 92 freely suspended from the conveyor and adapted to transport the wafers through a series of chemical processing steps. Each bucket is formed in an inverted V section open on top and is hung from the conveyor suspended between the parallel chains via a horizontal rod 93 from which are hung parallel side arms 94 having pins 95 extending pivotally into one side of the bucket. As the buckets approach the position of platform 87, a protruding pin 96 secured and extending from the chain actuates a lever 97 secured to an axially rotatable pinion 98 meshing with a rack 99 secured to the backside of gate 90. On engaging the lever, it is depressed downward rotating pinion 98 clockwise to lower the gate permitting the wafer on the platform to be advanced thereover. With the gate then removed, there is provided unimpeded passage for the wafer which then is urged forward by the feed rollers 85 onto an inclined chute from which the wafer descends into an open bucket that arrives coincidently into receiving position. Compressed coil spring 102, engaging the underside of the lever, then causes the gate to be restored to its normal position.

The buckets continue to transport the wafers passing over suitable guide rolls until descending into an etching bath 103 contained in a reservoir 105. The chemical composition of the bath is a function of the material to be etched, as for example, copper may conveniently be removed by immersing in a solution of ferric chloride to form conductive lines under the resist for conductors or capacitors. Other conductors may be formed of nickel or aluminum by etching in a bath of nitric acid and sodium hydroxide, respectively. Similarly, resistors may be formed from a chromium layer, the unprotected areas of which are removed by first dusting the layer with a fine zinc powder from a duster 106, having a lever 112 tripped by pin 109 and then dipping the wafer into a solution of hydrochloric acid; while a dielectric of magnesium oxide can be etched with nitric acid without attacking an underlying layer of aluminum. Similarly, nitric acid will not attack a layer of chromium underlying a layer of nickel.

Hence, in accordance with the invention, wafers on which for example circuits of resistance or conductive elements alone are to be formed are advanced after etching to a resist removal bath 107, which may comprise trichloroethylene or other suitable solvent contained in reservoir 108. Where additional elements are required such as adding of resistors to conductor or capacitor plates, they are refed for additional processing as will be described. After passing the resist removal bath, the buckets are tipped by a protruding stationary pin 109 that engages the buckets along its bevel causing the bucket to spill over and permitting the wafer contained in the bucket to fall free and descend into discharge chute 110 to descend gravitationally into a hopper collector bin 111.

Referring now more particularly to FIGS. 9 through 12, there is illustrated the reprocessing of plates as performed by plate processors A and B (FIG. 1). For this operation, the resist patterns are formed similarly as described above. In addition thereto, these plates are intended to be reprocessed for formation of additional circuit elements to be added thereto, such as resistance elements in circuit with already formed conductors or capacitors. Thus as particularly shown in FIG. 9, the wafer is immersed into an etching bath 120 in reservoir 121 to form conductor lines after which the bucket is tipped as before whereupon the wafer descends onto a chute 122 onto a vertically inclined roller conveyor 123 which turns the wafer about 180° from its former direction of travel to discharge onto an adjacent upwardly moving conveyor 124 at station B. This latter conveyor then delivers the wafer for reprocessing to a resistor feed magazine 129 as will be described. Therefore as particularly shown in FIG. 10, conveyor 124 driven by a motor M–8 receives the wafer from conveyor 123 and transmits the wafer upwardly until discharging into a hopper 125 wherefrom the wafers slide one at a time onto a support plate 126. Positioned behind the wafer on the support plate is a movable feed bar 130 that is solenoid actuated by means of solenoid SOL–1 that is spring returned by means of spring 131. The wafers in the magazine 129 are supported below the lowermost wafer by a pair of resilient dogs 132 which extend vertically spaced on each side of the magazine. The dogs are each urged inward by a spring 133 permitting the wafers to be inserted from the bottom and conveyed upwardly to a retained position.

In order that one wafer is always in position to be fed from the top of the stack onto conveyor 33, there is provided a mechanism under control of motor M–6 operative in conjunction with the feeding operation of motor M–3 to urge the stack upward in preparation for subsequent feeding. On the drive end of motor M–6 is a pinion 140 meshing with a rack 141 supported in guide means 146. At the top of the rack is a pair of oppositely supported dogs 142 that are spring biased towards each other by means of springs 143 and joined via plates 147 and 148 to be positioned in unison. These latter dogs ride approximately below the center of the lowest wafer in slots 144 and 145 of the magazine and as each wafer is fed off the top of the stack, motor M–6 is operative to advance dogs 142 upwardly to push the remaining topmost plate into feeding position. Therefore as may be seen, particularly in FIG. 11, all dogs 132 above the lowermost wafer are compressed and remain compressed while those below the lowermost wafer extend inward toward the center of the magazine.

Magazine 129 contains an opening 150 at the position of the feed bar 130 through which wafers supported on support plate 126 are received. In order to feed magazines up into the stack, there is provided a loading means under control of a motor M–7. On the drive end of motor M–7 is a pinion 151 meshing with a rack 152 adapted to slide vertically in a rack guide 153. The top of rack 152 contains a platform 154, the top surface of which is normally aligned with the surface of plate 126. When solenoid SOL–1 is operative, under control of a microswitch MS–3 in the hopper indicating the presence of wafers, feed bar 130 feeds the wafer onto platform 154, after which motor M–7 is energized raising platform to elevate the wafer up to the stack. The wafer continues to ascend until arriving at the dogs 142. As the wafer reaches the dogs 142, they are cammed outwardly by the presence of the wafer to actuate microswitch MS–1. This energizes a relay (not shown) that is effective through one contact to stop motor M–7 and through a second contact to energize motor M–6 for reverse momentary operation. Dogs 142 are then caused to descend the equivalent of one wafer space placing the dogs below the last fed wafer on withdrawal of rack 152. After a time delay sufficient to permit the dogs 142 to be dropped the one notch, the operation of motor M–7 is reversed to lower rack 152 whereby platform 154 is replaced into its loading position. Hence, these wafers which have been previously processed as for formation of conductors at station A can now be reprocessed to form resistor components thereon.

After formation of the various combinations of microcircuit plates, packaged active elements 54, such as transistors, diodes, etc., may be inserted into their proper relationship through holes 48 after which the plates may be processed through a quality control station to check electrical values in accordance with predetermined standards. They may then be assembled to form modules by means of the protruding tabs which are dipped into a bath of molten solder or other low melting alloy and then assembled to suitable similarly processed end-plates adapted to receive the tabs as, for example, disclosed in Sanders patent U.S. 2,876,390. This then can form a rigid unitary structure in the form of a module. Alternatively each module may then be checked and assembled to a "super module" by dip soldering or the like to form a complete complex circuit.

For utilizing the apparatus of the invention, operation would be as follows. An optimum circuit design is first determined and prepared on large layout drawings which are then reduced to a size corresponding to the dimensions of the particular wafer in which the microcircuit is to be formed. As described above, a master pattern is then prepared for each circuit. The master patterns are then arranged on a conductive sheet or positioned directly onto a drum in columns and rows. On receipt of an external signal, either by means of operating master controller 12 in a jukebox arrangement to select the proper circuit or alternatively under control of remote control apparatus desiring to reproduce a particular selected pattern, the drum is indexed to advance the row containing the selected pattern to the charging station. Simultaneously, the charging unit 21 under control of motor M–2 is positioned axially until in charging position above the selected pattern. Optionally, as stated above, all patterns may be continually charged as they advance past the charging apparatus without the feature of selectivity. The drum at that position starts rotating while the corona generating device 21 is energized such that as the pattern passes under the charging unit, it receives a uniform electrostatic charge. Thereafter the charge pattern on rotating past developing apparatus 25 receives an application of electroscopic powder to effect development of the master pattern with a resist material.

Wafers on which the patterns are to be formed are supplied from a magazine 32 by means of a magazine feeder control operating a feeder bar 38. The feed is timed to operate such that when a particular master is being charged, a wafer in a magazine corresponding to a column in which the pattern is contained is ejected on the conveyor 33 to arrive at the transfer station coincident with the arrival of the master pattern bearing the developed image. At the transfer station, the resist image formed at the developing station is transferred to the wafer, and at the fixing station, the resist is affixed to the wafer surface. The wafers are then processed through a chemical etch bath to etch away the uncovered wafer laminae supporting the resist after which they may be passed into a resist removal bath. The plates thus processed may be discharged for assembly elsewhere or optionally, the wafers can be returned before or after resist removal to another magazine from where they are supplied to receive a second resist pattern for re-etching to form additional components. After all the wafers have been processed for formation of their respective elements, active packaged elements are inserted into appropriate accommodating holes or other receiving provisions. After complete formation of all the circuits, they are assembled for formation of the modules as aforesaid.

By the apparatus of the invention, microcircuitry can be mass produced in an expedient manner which allows selectivity in production. Any master circuit pattern can be selected for reproduction from a plurality of patterns on drum 11 and as many reproductions as required can be reproduced. Either the drum, or optionally if a sheet supporting the master patterns is used, the sheet can be removed and other sheets having additional patterns substituted therefor. If the drums are interchangeable, drums bearing different circuit patterns can be interchanged. By this means, any circuit pattern can be quickly reproduced in printed circuit form on signal indicating a requirement for its reproduction. Alternatively, continuous large volume can be mass produced of the same circuits by continuous operation of the apparatus.

Since many changes can be made in the above construction and many apparently widely different embodiments of this invention could be made without departing from the scope thereof, it is intended that all matter contained in the drawings and specification should be interpreted as illustrative and not in a limiting sense. For example, the particular feed and index mechanisms disclosed are adapted to the general production of microprinted circuits of any type of printing means from patterns. Further in addition to xeroprint patterns, it is intended that xerographic images repeatedly or selectively formed, i.e., in which a radiation image is exposed to a precharged photoconductive insulator before development, as well as xerochemographic plates described above be also included within the scope of the invention. The use of xerography for forming resist patterns is disclosed in Van Wagner Patent U.S. 2,919,179.

In addition while the apparatus of the instant invention have been described as particularly useful in forming resistors, capacitors and conductive lines in a 2D printed circuit, the techniques and materials of the instant invention are capable of substantially wider use. Thus, as disclosed in U.S. 2,662,957 by Paul Eisler, the fabrication of 2D circuit components is a technique suitable to the fabrication of light-sensitive elements, rectifying devices, transistors, strain gauges, devices based on the thermo-electric effect, the Hall constant, etc. It is evident that the techniques and products of the instant invenion are also applicable to the fabrication of such devices as cryotrons and thin film ferromagnetic and ferroelectric devices. Further, as pointed out by Dr. Eisler, the term "resistor" as used in this art has a wide range of meanings. Essentially, the instant invention makes possible the fabrication of circuit elements, either magnetic or electric, wherein there are used conductive lines, resistors (as defined in the said U.S. 2,662,957) and wherein the electrodes are formed on each side of a dielectric material which electrode materials may have different electrical properties.

What is claimed is:

1. Apparatus for forming printed circuits onto substantially rigid plates comprising in combination:
   - (a) an endless and movable support means supporting a plurality of master circuit patterns thereon, each of said patterns being arranged spaced apart from the others of said patterns and comprising electrically insulating circuit image areas on a backing material capable of dissipating electric charge;
   - (b) selector means operatively connected to control formation of a printed circuit from selected patterns;
   - (c) drive means connected to said pattern support to effect movement thereof under the control of said selector means;
   - (d) charging apparatus movably supported and positionable on its support;
   - (e) second drive means connected to the support of said charging apparatus and actuated by said selector means to position said charging apparatus adjacent selected patterns on said pattern support for the application of electrostatic charge thereto;
   - (f) developing apparatus disposed adjacent to said pattern support for presenting electroscopic developer powder to the charged master pattern during the movement of said pattern support;
(g) storage means mounted opposite said pattern support and containing a plurality of stacked laminated wafer plates on which the circuit of the patterns are to be formed;
(h) feed means actuated by said selector means in timed relation to the movement of said pattern support and including means to advance a plate from the stack in said storage means into and out of face-to-face contact with the developed master pattern on said support during the movement thereof;
(i) electrostatic transfer means mounted at the site of said face-to-face contact of said advancing plate and the developed master pattern to effect transfer of developer from the developed master pattern in pattern configuration to the surface of the advancing plate;
(j) fusing means disposed along the path of the advancing plate effected by said feeding means following transfer to bond the transferred pattern to the surface of the wafer plate; and,
(k) conveying means disposed along the path of said advancing plate beyond said fusing means to receive said developer-bearing wafer plate and to convey said plate through a selected chemical solution adapted to etch away the surface of said plate unprotected by the developer pattern thereon.

2. Apparatus according to claim 1 in which said feed means includes:
(a) a pair of oppositely arranged movable grippers adapted to grip a plate from said storage means and move the plate past said face-to-face contact; and,
(b) cam means adapted to effect operation of said grippers to grip and release a plate at predetermined positions of travel.

3. Apparatus according to claim 1 including means to recycle a wafer on which first circuit components have been formed to add second circuit components in circuit relation to said first formed circuit components.

4. Apparatus according to claim 1 in which said fusing means comprises vapor fusing means including means to generate a vapor of a solvent for said electroscopic developer powder.

5. Apparatus for forming printed circuits onto substantially rigid plates comprising in combination:
(a) rotatable drum support means supporting a plurality of master circuit patterns each positioned thereon spaced apart from others of said patterns and arranged in accordance with the electrical similarity of separate circuit components to be formed, each of said patterns comprising electrically insulating circuit image areas on a backing material capable of dissipating electric charge;
(b) selector means operatively connected to control formation of a printed circuit from selected patterns;
(c) drive means connected to said drum to effect rotation thereof under the control of said selector means;
(d) charging apparatus movably supported and positionable on its support;
(e) second drive means connected to the support of said charging apparatus and actuated by said selector means to position said charging apparatus adjacent selected patterns on said drum for the application of electrostatic charge thereto;
(f) developing apparatus disposed adjacent to said drum for presenting electroscopic developer powder to the charged master patterns during the rotation of said drum; and,
(g) at least two separate plate processing means arranged corresponding to the arrangement of master patterns on said drum, each plate processing means being physically aligned in association with specific master patterns on said drum and including:
(1) a magazine mounted opposite said drum and containing a plurality of stacked wafer plates of electrical property corresponding to the circuit component representatively contained on the master patterns associated therewith; and,
(2) feed means actuated by said selector means in timed relation to the rotation of said drum and including means to advance a plate from the stack in said magazine into and out of face-to-face contact with the associated developed master pattern on said drum during the rotation thereof and past a plurality of sequentially arranged treating means, said treating means including:
(a) electrostatic transfer means mounted at the site of said face-to-face contact of said advancing plate and the developed master pattern to effect transfer of developer from the developed master pattern in pattern configuration to the surface of the advancing plate;
(b) fusing means to bond the transferred pattern to the surface of the wafer plate; and,
(c) means to receive said developer-bearing wafer plate and to convey said plate through a first selected chemical solution adapted to etch away the surface of said plate unprotected by the developer pattern thereon and then through a second chemical solution to remove the bonded developer pattern from the plate surface to reveal electrical components of a circuit to be formed.

References Cited by the Examiner

UNITED STATES PATENTS

| | | | |
|---|---|---|---|
| 1,908,487 | 5/1933 | Powers | 156—345 XR |
| 2,576,047 | 11/1951 | Schaffert | 118—637 XR |
| 2,726,166 | 12/1955 | Greaves | 95—1.7 |
| 2,884,704 | 5/1959 | Bolton | 95—1.7 |
| 2,919,967 | 1/1960 | Schwertz | 95—1.7 |
| 3,050,422 | 8/1962 | Zak | 156—24 |
| 3,075,866 | 1/1963 | Baker et al. | 156—13 |
| 3,079,483 | 2/1963 | Codichini et al. | 118—637 XR |
| 3,094,036 | 6/1963 | Benson | 95—1.7 XR |
| 3,109,355 | 11/1963 | Ritzerfeld et al. | 118—637 XR |

ALEXANDER WYMAN, *Primary Examiner.*

JACOB STEINBERG, *Examiner.*